(12) United States Patent
Khaydarov (10) Patent No.: US 7,356,053 B2
(45) Date of Patent: Apr. 8, 2008

(54) MODE-LOCKED LASER WITH VARIABLE PULSE DURATION

(75) Inventor: Dzhakhangir V. Khaydarov, Campbell, CA (US)

(73) Assignee: Continuum Electro-Optics, Inc., Santa Clara, CA (US)

( * ) Notice: Subject to any disclaimer, the term of this patent is extended or adjusted under 35 U.S.C. 154(b) by 458 days.

(21) Appl. No.: 10/679,985

(22) Filed: Oct. 6, 2003

(65) Prior Publication Data

US 2005/0074038 A1 Apr. 7, 2005

(51) Int. Cl.
*H01S 3/098* (2006.01)

(52) U.S. Cl. .............................. 372/18; 372/10; 372/11

(58) Field of Classification Search ................. 372/10, 372/11, 18
See application file for complete search history.

(56) References Cited

U.S. PATENT DOCUMENTS

| | | | | |
|---|---|---|---|---|
| 4,833,333 A | * | 5/1989 | Rand | 250/492.3 |
| 4,854,676 A | * | 8/1989 | Kalyanaraman et al. | 359/243 |
| 4,980,566 A | * | 12/1990 | Heilweil | 250/339.07 |
| 5,175,664 A | * | 12/1992 | Diels et al. | 361/213 |
| 5,345,454 A | * | 9/1994 | Keller | 372/12 |
| 5,802,083 A | * | 9/1998 | Birnbaum | 372/11 |
| 6,002,697 A | * | 12/1999 | Govorkov et al. | 372/34 |
| 6,252,892 B1 | * | 6/2001 | Jiang et al. | 372/11 |
| 6,546,027 B1 | * | 4/2003 | Khaydarov | 372/10 |
| 6,928,090 B1 | * | 8/2005 | Peremans et al. | 372/18 |

OTHER PUBLICATIONS

Del Corno et al., Active-passive mode-locked Nd:YAG laser with passive negative feedback, Optics Letters, vol. 15, No. 13, Jul. 1, 1990.*

Il'ichev et al., Model of a passively Q-switched laser accounting nonlinear absorption anisotropy in a passive switch, Proceedings of Nonlinear Optics: Materials, Fundamentals, and Applications Topical Meeting, 113-115 (1998).*

Bartschke, Diode-pumped passively self-frequency-doubling Nd-YAB laser, J. Opt. Soc. Am. B., vol. 14, No. 12, Dec. 1997.*

Song et al. ("Passively Q-switched diode-pumped continuous-wave Nd:YAG-Cr4+:YAG laser with high peak power and high pulse energy", Applied optics, vol. 39, No. 27, Sep. 20, 2000, p. 4954-4958).*

(Continued)

*Primary Examiner*—Minsun Oh Harvey
*Assistant Examiner*—Tod T. Van Roy
(74) *Attorney, Agent, or Firm*—Edwards Angell Palmer & Dodge LLP (57) ABSTRACT

A pulsed, mode-locked, picosecond laser having a solid-state laser medium, a saturable absorber (SA), and a passive negative feedback (PNF) element. The SA is "slow," having an absorption recovery time which is longer than a desired duration of an output pulse. The SA and the PNF element together mode-lock the laser to produce an output pulse or pulses of a given duration. The position of the SA along the beam path and the orientation of the SA with respect to the beam path can be varied to vary the output pulse duration over a wide range.

28 Claims, 6 Drawing Sheets

OTHER PUBLICATIONS

Bai et al. (Passively Q-switched Nd:YVO4 laser with a Cr4+:YAG crystal saturable absorber, Applied Optics, vol. 36, No. 12, p. 2468-2472, Apr. 20, 1997).*

"50 Ps Pulses From A Flashlamp Pumped Nd:YAG Laser Using All-Solid-State Passive Pulse Control"; (Bieger, Diels, Kubecek and Kokta) Optical Society of America, 1999 (pp. 317-319).

"Model Of A Pssively Q-Switched Laser Accounting NonLinear Absorption Anisotropy In A Passive Switch", (Pichev, Kir'yanov and Pashinin) IEEE 1998 (pp. 113-115).

"Cw-Diode-Pumped Nd: GdV04-Laser Passively Q-Switched With G4+:YAG As Saturable Absorber", (Klimove, Tsvetkov, Shcherbakov, Barlschke, Boller and Wallenstein), pp. 172-174.

* cited by examiner

MODE-LOCKED LASER WITH VARIABLE PULSE DURATION

FIELD OF THE INVENTION

The present invention relates generally to lasers, and more particularly, to solid state mode-locked lasers capable of producing output pulses of different durations.

U.S. Pat. No. 6,546,027 (hereinafter the "'027 patent"), entitled LASER SATURABLE ABSORBER AND PASSIVE NEGATIVE FEEDBACK ELEMENTS, AND METHOD OF PRODUCING ENERGY OUTPUT THEREFROM, which issued on Apr. 8, 2003, is herein incorporated by reference in its entirety.

BACKGROUND INFORMATION

Lasers producing picosecond output pulses, or "picosecond lasers," are useful in many scientific applications. For example, a parametric laser cavity producing high-power, tunable, picosecond pulses, is useful for nonlinear optical studies of narrow-band transitions in the near- and mid-infrared spectral regions. Nd-based, solid-state lasers having an Nd-doped active medium, are the most common and widely used picosecond lasers.

Generally, picosecond lasers, such as an Nd-based, solid-state laser, are constructed in one of two ways in order to generate energetic, picosecond pulses. In a first exemplary construction, the laser contains a regenerative amplifier (RGA) for amplifying a seed pulse from about 10 µJ (micro-Joule) up to the moderate level of 1 to 10 mJ (milli-Joule). The laser also contains a power amplifier for boosting the pulse energy further up to about 100 mJ (milli-Joule). Such a laser is usually built using a hybrid system consisting of a low-power, diode-pumped, continuous-wave, mode-locked laser, and pulsed, flashlamp-pumped, regenerative power amplifiers. By combining two different laser platforms, such a laser is both expensive and complicated to use.

In a second exemplary construction, the Nd-based laser contains a pulsed Q-switched and mode-locked oscillator for generating a short pulse of 1 to 10 mJ, and a power pulsed amplifier for amplifying the pulse power to about 100 mJ. As is well known, Q-switching is a rapid change of optical losses, i.e., parameter "Q", of an optical resonator resulting in generation of an intense pulse with short, e.g., nanosecond, duration. Mode locking is a method to produce very short pulses of picosecond or femtosecond duration. Both Q-switching and mode locking can be accomplished using active as well as passive devices. A Q-switched and mode-locked laser produces trains of picosecond pulses with the duration of each train being tens to hundreds of nanoseconds. Because both the oscillator and the amplifier are built using the same components, operation of this laser is greatly simplified.

The Nd-based pulsed picosecond laser described above requires a saturable absorber (SA) with a fast recovery time, or a "fast SA." A fast SA typically used in pulsed picosecond lasers is a dye solution. While a dye solution operates fairly reliably, it may be toxic and must be replaced and maintained on a regular basis.

Progress has been made in the development of fast, semiconductor-based SAs for mode-locking solid-state lasers. However, while these fast, solid-state SAs perform successfully in continuous-wave lasers, they have not been reported as being operable in pulsed, solid-state lasers.

Slow, solid-state SAs can produce ultra-short pulses, provided fast gain depletion or soliton formation occurs in the laser resonator. Unfortunately, these conditions are difficult to obtain in pulsed, flashlamp-pumped $Nd^{3+}$:YAG lasers.

The '027 patent describes a laser structure with a solid-state SA, which, unlike a dye solution SA, does not require replacement and maintenance over the lifetime of the laser, and does not have the problems associated with conventional solid-state SAs.

The $Cr^{4+}$:YAG crystal has certain characteristics that make possible its use as a slow SA for passively Q-switching Nd-based lasers. One such characteristic of the $Cr^{4+}$:YAG crystal is its strong absorption band near 1060 nm that allows it to perform as a saturable absorber at the wavelength of an Nd-based laser (1064 nm). Another of these characteristics is its absorption recovery time of about 8 µs. This recovery time makes $Cr^{4+}$:YAG an ideal passive Q-switch for an Nd-based lasers. For an SA to perform well as a passive mode-locker, however, the SA must have an absorption recovery time much shorter than the round-trip cavity time (usually on the order of 5-10 nanoseconds) and similar to, or shorter than, the desired duration of a laser output pulse. Because of its relatively long absorption recovery time, the $Cr^{4+}$:YAG crystal cannot passively mode-lock the laser to produce picosecond pulses.

A pulsed $Nd^{3+}$:YAG picosecond laser using a fast SA dye solution typically produces output pulses of 30 to 40 picoseconds. A negative feedback technique can be used to control pulse duration and energy stability in mode-locked lasers. For example, a passive negative feedback element can be used to shorten the pulse duration of a $Nd^{3+}$:YAG picosecond laser with a fast SA dye solution to 10 to 15 picoseconds.

The '027 patent describes a pulsed, solid-state, Q-switched and mode-locked laser for generating short picosecond pulses of stable energy, which does not require a fast SA dye solution, is simple to use and is very stable. An exemplary laser described therein comprises a solid-state laser medium, such as an $Nd^{3+}$-doped crystal, a saturable absorber (SA) for Q-switching, and a passive negative feedback (PNF) element. The SA element is "slow," having an absorption recovery time which is longer than a desired duration of an output pulse. Typically, this slow SA would not be capable of operating well on its own as a passive mode-locking element. In the exemplary laser of the '027 patent, however, the combined action of a slow SA and PNF elements allows the pulsed mode-locked laser to produce an output pulse or pulses of the desired duration. In an exemplary embodiment, the laser comprises a $Nd^{3+}$:YAG laser medium. The slow SA is preferably a $Cr^{4+}$:YAG crystal and the PNF element is preferably a GaAs wafer.

The solid-state laser (oscillator) of the '027 patent is capable of producing very short, energetic output pulses having a duration on the order of one or more picoseconds, such as from about 1 to about 200 picoseconds, and an energy of from about 100 µJ to about 2 mJ.

In addition to the aforementioned properties, it is also desirable for a picosecond laser to generate pulses whose durations can be varied. It has been observed that the pulse duration of lasers such as that of the '027 patent having an SA of $Cr^{4+}$:YAG has a marked dependency on the position of the SA in the resonator.

Generally, the angular dependence of saturation fluence in the crystalline SA (such as $Cr^{4+}$:YAG and $LiF:F_2^-$) causes pulse energy and duration variations in Q-switched lasers when the crystal axis is rotated relative to the polarization of the laser radiation. In the case of $Cr^{4+}$:YAG, pulses with the highest energy and shortest duration are generated when the optical polarization is along the crystal axis, whereas pulses with the lowest energy and longest duration are generated when the optical polarization is at 45° to the crystal axis. The pulse parameters also depend on the ratio of the intensities (or mode sizes) in the active medium and the SA: the higher the relative intensity in the SA, the shorter, more energetic the Q-switched pulse that is generated.

Several publications describe the dependence of the output parameters of a Q-switched laser on the orientation and position within the laser resonator of the passive Q-switch, i.e., the $Cr^{4+}$:YAG SA element. See, e.g., I. V. Klimov, V. B. Tsvetkov, I. A. Shcherbakov, J. Bartschke, K.-J. Boller, and R. Wallenstein, CW-diode-pumped Nd:GdVO$_4$-laser passively Q-switched with $Cr^{4+}$:YAG as saturable absorber, Proceedings of Advanced Solid State Lasers Conference, 172-174 (1996); N. N. Il'ichev, A. V. Kir'yanov, and P. P. Pashinin, Model of a passively Q-switched laser accounting nonlinear absorption anisotropy in a passive switch, Proceedings of Nonlinear Optics: Materials, Fundamentals, and Applications Topical Meeting, 113-115 (1998).

SUMMARY OF THE INVENTION

The present invention provides a mode-locked laser which generates pulses whose duration can be varied over a wide range. An exemplary embodiment of a laser in accordance with the present invention comprises a saturable absorber (SA) comprising $Cr^{4+}$:YAG. Pulse duration is varied by varying the location and orientation of the SA along the beam path. In an exemplary embodiment, an SA can be inserted into the beam path at one of five positions to provide coarse pulse duration variability. The orientation of the SA at each position can be varied between 0 and 45 degrees to provide fine pulse duration variability.

BRIEF DESCRIPTION OF THE DRAWINGS

In FIGS. 2A-2C the x-axis represents time (ns), the y-axis represents pulse amplitude (mV), the full screen in the x-direction represents 400 ns, and the full screen in the y-direction represents 1000 mV.

DETAILED DESCRIPTION

Figure 1:
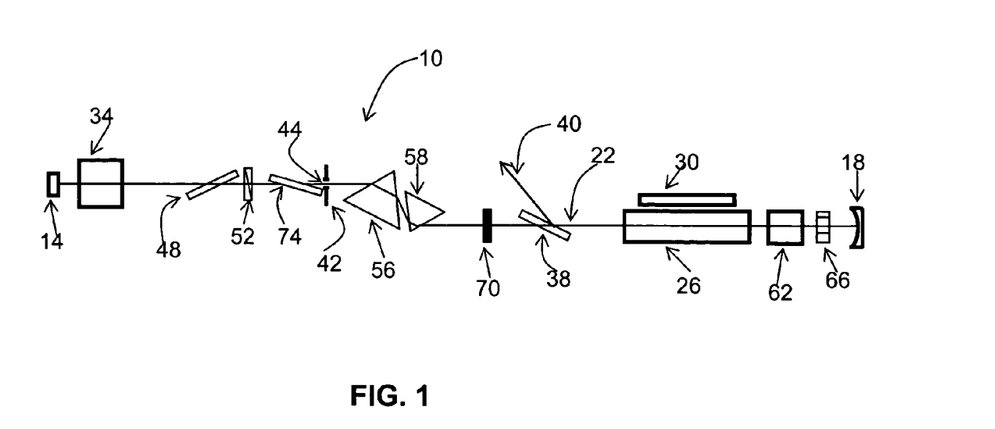
FIG. 1 is a schematic illustration of an exemplary embodiment of a laser in accordance with the present invention.

FIG. 1 is a schematic illustration of an exemplary embodiment of a laser 10 in accordance with the present invention. The laser 10 is arranged in a cavity ("resonator cavity") which is bounded by a reflective surface 14 at one end (the "proximal" end) and another reflective surface 18 at an opposite end (the "distal" end). The reflective surfaces are preferably highly reflective, such as a highly reflective mirror. The reflective surfaces may be planar, convex, or concave, and are preferably, concave. The reflective surface 14 and the reflective surface 18 may differ in one or more characteristics, such as the degree of reflectivity, the degree of planarity or concavity, and the like. A pathway for radiant beams is established between the two surfaces 14 and 18, as schematically represented by line 22. The length of the beam pathway may be from about 50 cm to about 200 cm, and preferably, from about 80 cm to about 120 cm (e.g., 90 cm). The pathway for a beam making a round-trip of the resonator cavity is twice the length of the length of the beam pathway.

The laser 10 has various elements arranged between the proximal and distal ends along the beam pathway, as shown in FIG. 1. One of these elements is a solid-state laser medium 26, which may be an $Nd^{3+}$-doped crystal, or rod, although other media are possible. Preferably, the solid-state laser medium 26 is an $Nd^{3+}$:YAG crystal. Operably associated with the solid-state medium 26 is a source of pulsed energy 30 for energizing the medium, such as one or more flashlamps. The source of pulsed energy 30 is coupled to an electrical power supply (not shown) which may provide from about 5 to about 30 Joules per pulse of energy (e.g., 17.5 Joules per pulse of energy). When the solid-state medium 26 is energized by the source of pulsed energy 30, at least one beam of radiant light energy, or laser energy, is produced within the cavity.

An acousto-optic mode-locker 34 is also provided along the beam pathway within the cavity. The acousto-optic mode-locker 34 has a resonance that defines the optimum length of the resonator cavity. In an exemplary embodiment, the mode-locker 34 may have a resonance of about 70 MHz, such that the optimum optical length of the resonator cavity is about 107 cm. In operation, the mode-locker 34 initiates the formation of pulses of radiant energy within the cavity. That is, the acousto-optic mode-locker 34 ensures that the radiant light energy produced when the solid-state medium 26 is energized, is in or takes the form of pulses of radiant energy within the cavity, and that there is only one pulse of radiant energy traveling in the cavity.

A means 38 for providing an energy output 40 is also provided along the beam pathway within the cavity. The means 38 is sufficient for providing an energy output of at least one pulse having energy of from about 100 μJ to about 2 mJ and a duration on the order of one or more picoseconds. Herein, "duration" refers to the full-width half-maximum (FWHM) duration, and the terms "duration" and "FWHM duration" may be used interchangeably unless specifically indicated otherwise. The means 38 for providing the energy output from the cavity may include a partially reflecting optical element that directs an output beam out of the cavity, such as a polarizer or a thin-film polarizer. The energy output means may further include a Pockels cell 62. When energized by an applied voltage, the Pockels cell 62 functions as a quarter-wave element that rotates polarization of the transmitted beam by 90 degrees after two passes (i.e., one pass toward and one pass away from the reflective surface 18). In general, the Pockels cell 62 may be replaced by a quarter-wave plate that is rotated through a small angle. Such a plate would partially couple the whole pulse train to the output. The same result could be achieved by replacing the reflective surface 18 with a partially transmitting mirror, or output coupler.

The laser cavity also houses a beam-limiting element 42 that defines an aperture 44, or pinhole. The aperture 44 is aligned with the beam pathway. In operation, a radiant beam from the solid-state laser medium 26 travels in a proximal direction toward the beam-limiting element 42. When the beam reaches the beam-limiting element 42, only a portion of the beam passes through the beam-limiting aperture 44 and continues on toward the proximal reflective surface 14. The portion of the beam passing through the aperture is defined, at least in part, by the size of the aperture. In an exemplary embodiment, the aperture may have a diameter of from about 0.3 to about 0.7 mm, and preferably, from about 0.4 to about 0.6 mm, about 0.5 mm being typical. A further portion of the beam diverges on the proximal side of the aperture, predominantly as a result of diffraction at the edges of the aperture. When a portion of the beam reaches the reflective surface 14, the beam or some portion of it (depending on the reflectivity of the surface 14), is reflected in a distal direction toward the beam-limiting element 42. The portion of the beam passing through the beam-limiting aperture 44 diverges at least to some extent on the distal side of the aperture, again, predominantly as a result of diffraction at the edges of the aperture. The divergence of a portion of the beam, the flatness or curvature of the reflective surface 14, and the length of the cavity from the proximal reflective surface 14 to the distal reflective surface 18, may be selected to collimate the beam as desired. Collimation of the beam is controlled mostly by the radius of the reflective surface 18, which may be about 3 m in an exemplary embodiment. Collimation of the beam is preferred, but not essential.

The laser 10 may include other elements, such as: a partially reflecting optical element 48, for example, a polarizer or a thin-film polarizer; a half-wave plate 52; means for providing an adjustable delay, for example, a delay line comprising two prisms 56 and 58; a Pockels cell 62, as described above; and a soft apodizer 66. The adjustable delay line 56, 58 is used to match the cavity length to the resonant frequency of the acousto-optic mode-locker 34, although alternately, this could be achieved by adjusting the position of one or both of the reflective surfaces 14 and 18.

The laser cavity includes a "slow" saturable absorber (SA) element 70 that has an absorption recovery time that is longer than a desired duration of an output pulse and the round-trip time of the laser resonator. In an exemplary embodiment, the desired duration of an output pulse is on the order of one or more picoseconds. The SA element 70 can be arranged at various locations along the beam pathway due to the fact that it is slow and its primary function is Q-switching. This is in contrast to a "fast" Q-switching and mode-locking SA which would be adjacent to either the proximal reflective surface 14 or the distal reflective surface 18. FIG. 1 shows SA element 70 located between the output element 38 and the adjustable delay line 56, 58.

The SA element 70 may be a solid-state element, such as a $Cr^{4+}$-doped crystal or an $LiF:(F_2)^-$ color center crystal. Preferably, the SA element 70 comprises a $Cr^{4+}$-doped crystal, such as a $Cr^{4+}$:YAG crystal. The SA element 70 preferably has a certain dopant concentration and/or a certain physical thickness or physical length. For example, for a $Cr^{4+}$-doped SA, the concentration of $Cr^{4+}$ may be from about 0.05 to about 1 atomic percent, and preferably, from about 0.5 to about 0.6 atomic percent. Further by way of example, for a $Cr^{4+}$-doped SA, such as a $Cr^{4+}$:YAG crystal, the SA element may have a thickness of from about 1 mm to about 40 mm, and preferably, from about 2 mm to about 5 mm. As the dimension of the $Cr^{4+}$:YAG crystal along the optical axis is shorter than the transverse dimension, physical thickness is used to define the dimension along the optical axis of the crystal.

An $LiF:(F_2)^-$ color center crystal has a maximum linear absorption coefficient that is about an order of magnitude lower than that of a $Cr^{4+}$:YAG crystal. Thus, an $LiF:(F_2)^-$ color center SA may have a length of from about 20 to about 50 mm. As the dimension of the $LiF:(F_2)^-$ color center crystal along the optical axis is typically longer than the transverse dimension, physical length is used to define the dimension along the optical axis of the crystal. The SA element 70 may have a certain linear unsaturated absorption that can be expressed in terms of an optical density (OD). Preferably, the optical density of the SA element 70 is from about 0.1 OD to about 1 OD.

The laser cavity also includes a passive negative feedback (PNF) element 74. Negative feedback is used to control the duration of pulses and the stability of energy produced by passively or actively-passively mode-locked lasers. Passive negative feedback techniques provide various advantages over active negative feedback techniques, such as an instantaneous response capability and an ability to operate without additional high-voltage and high-speed electronics. The passive negative feedback technique is thus preferably employed in the operation of the laser of the present invention.

The PNF element 74 is arranged along the beam pathway, and preferably, proximally adjacent the beam-limiting element 42, as shown in FIG. 1. Preferably, the PNF element 74 is disposed at about a Brewster angle relative to the beam pathway. The PNF element 74 may be composed of a semi-insulating material, or a substantially dopant-free semiconductor material, as such material can be used to make an efficient solid-state, optically limiting element having a fast response time. The PNF element 74 exhibits two-photon absorption at certain wavelengths. Thus, the PNF element 74 may be made of an appropriate semi-insulating material that has a two-photon absorption band located in a spectral range that is appropriate for the solid-state laser medium 26, such as an Nd-doped medium. When the PNF element 74 undergoes two-photon absorption, free carriers are generated such that the refractive index of the element decreases.

Preferably, the PNF element 74 is a solid-state element, such as a GaAs or CdSe wafer, that demonstrates two-photon absorption at wavelengths appropriate for an Nd-doped laser medium. For example, a semi-insulating GaAs wafer demonstrates such absorption near a wavelength of from about 0.9 to about 1.7 µm. This absorption leads to the generation of free-carriers, that in turn, leads to a reduction in the refractive index of at least a portion of the PNF element that is aligned with the center of a beam traveling along the beam pathway. The refractive index distribution across the PNF element 74 that results from the beam distribution across it creates a negative lens. Thus, when a beam of radiant energy of a certain wavelength reaches the PNF element 74, the PNF element demonstrates two-photon absorption causing the PNF element 74 to behave as a negative lens. A beam of radiant energy traveling in a proximal direction through this negative lens diverges as it leaves the lens and continues on toward the reflective surface 14. When the beam is reflected back, traveling in a distal direction through this negative lens, it diverges further as it approaches the beam-limiting element 42. As the beam travels further in the distal direction through the beam-limiting aperture 44, it experiences additional losses. The beam thus experiences significant additional losses when traveling the relatively long path from the PNF element 74 to the reflective surface 14 and back through the PNF element and the aperture 44.

Figure 2A:
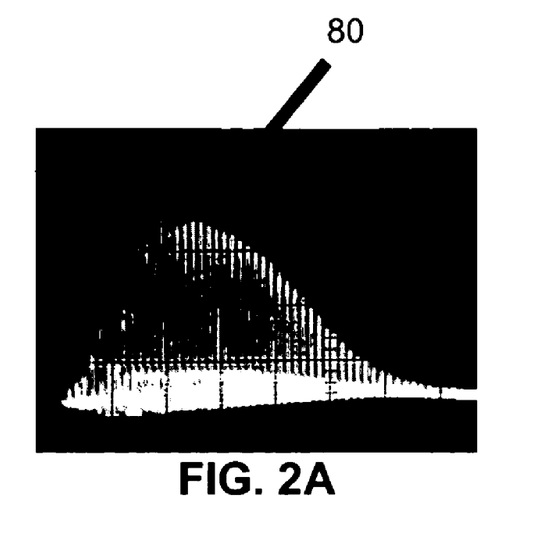
FIG. 2A is a graphical illustration of a pulse train produced by a laser of the present invention with the saturable absorber located as shown in FIG. 1.
Figure 2B:
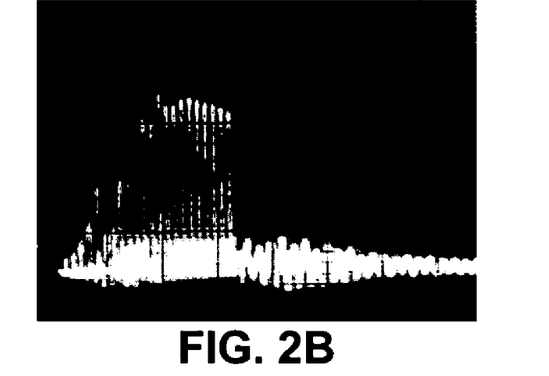
FIG. 2B shows the same pulse train when the pulse switching is activated and the single pulse is switched out about 150 ns after the beginning of the pulse train.

The negative lens described above is formed almost instantaneously when an intense portion of the pulse reaches the PNF element 74. The negative lens then decays within a few nanoseconds, before the pulse returns to the PNF element 74 during another round-trip through the resonator cavity. A pulse of high intensity produces a stronger negative lens in the PNF element, and thus, produces higher losses, than a pulse of lower intensity. The intracavity intensity and the output energy of the laser are thus stabilized at a level (defined by the PNF element 74) that is lower than that achieved by a laser having no PNF element. As a lower amount of energy is extracted from the laser medium 26 on each round-trip of the resonator cavity, the pulse train produced by the laser is extended, and thus, rendered more stable. The PNF element 74 thus stabilizes the output pulse energy produced by the laser. A stable pulse train produced by an exemplary laser of the present invention is shown in FIG. 2.

Generally, the combination of the PNF element 74 and the pinhole 44 transmits the leading, low-intensity edge of a pulse with substantially no, or relatively little, additional loss, and transmits the intense peak of the pulse and the tail of the pulse with losses. The PNF element 74 effectively shortens the duration of the pulse on every round-trip through the resonator cavity until equilibrium is reached. When a PNF element is used with a typical $Nd^{3+}$:YAG laser having a fast SA dye solution, the pulse duration becomes about 10 to about 15 picoseconds, as opposed to the typical 30 to 40 picoseconds associated with an $Nd^{3+}$:YAG laser lacking a PNF element. A laser according to the present invention having a "slow" SA and a PNF element, demonstrates a pulse-shortening phenomenon such as that associated with the typical $Nd^{3+}$:YAG laser. The combined action of the mode-locker 34, the slow SA acting primarily as a passive Q-switch, and the PNF element 74, mode-locks and Q-switches the laser to produce at least one short, energetic output pulse of radiant energy having, for example, a duration on the order of one or more picoseconds and an energy of from about 100 μJ to about 2 mJ. By way of example, the output pulse may have a duration of from about 1 to about 200 picoseconds.

Preferably, the elements described above are arranged along the beam pathway, as shown in FIG. 1, to optimize the output energy and the beam size. Other configurations are possible, taking into account the following: (1) the solid-state gain medium 26 and the Pockels cell 62, if any, should be on the same side of the polarizer 38 to provide maximum output; (2) the acousto-optic mode-locker 34 should be as close as possible to the reflective surface 14 to ensure that only a single oscillating pulse is present per round-trip time of the laser resonator; (3) the SA element should be located between the output element 38 and the proximal reflective surface 14 to provide maximum laser output (not to attenuate the output due to its residual absorption); and (4) the PNF element 74 should be as close as possible to the aperture 44 to ensure that the intensity of the beam propagating through the PNF element toward the reflective surface 14 is as high as possible.

Figure 2C:
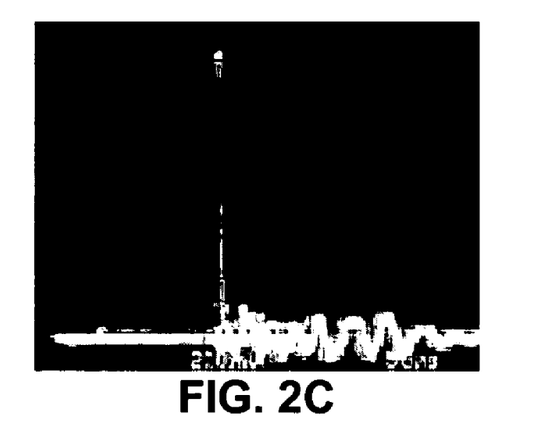
FIG. 2C is a graphical illustration of a pulse switched out of the pulse train shown in FIG. 2A.

Pulse train elongation is a distinctive feature of lasers operating with a PNF element. The pulse train may have a relatively flat central part 80, as shown in FIG. 2A. FIG. 2C shows a pulse that was switched out of the laser cavity in the middle of the central part 80 of the train. The switched-out pulse has a duration, or FWHM duration, of about 50 picoseconds and an energy of about 1 mJ (millijoule)

As described in the '027 patent, a laser with a resonator of optimal length produces symmetric pulses with no pre- or post-pulses and with very stable energy. The '027 patent also discloses that the pulse duration is dependent upon the position of the pulse in the pulse train due to the continuous process of the pulse shortening by the PNF element. In an exemplary embodiment of the present invention, the pulse is switched out at a fixed delay (e.g. 150 ns) from the beginning of the pulse train, and the dependence of the duration on the location within the pulse train is not taken into consideration.

An exemplary laser in accordance with the present invention can produce a pulse train of from about 10 to about 200 pulses, and preferably, from about 20 to about 80 pulses. Optimal results, in terms of energy stability and pulse shape, or symmetry, for example, have been obtained from a laser, according to the present invention, used to produce a pulse train of from about 30 to about 50 pulses. The pulse train may have a duration of from about 50 nanoseconds to about 1400 nanoseconds.

In another aspect of the present invention, the duration of pulses generated with a laser of the present invention can be varied. It has been observed that the pulse duration of a laser of the present invention with a slow SA of $Cr^{4+}$:YAG has a marked dependency on the position and orientation of the SA in the resonator cavity.

A saturable absorber becomes more transparent as the optical fluence F (pulsed energy propagating through the unit area of the beam cross-section; measured in J/cm²) increases. Absorption saturation is characterized by the saturation fluence $F_s$. When the fluence F of the optical pulse reaches the saturation value for the absorbing media, the absorption coefficient of the media effectively decreases by a factor of 2. The linear transmission T of isotropic, non-crystalline absorbing media (dye solution for example) can be represented by the following expression:

$$T=\exp\{-\alpha l\} \quad \text{(Eq. 1a)},$$

where: α is the linear absorption coefficient in $cm^{-1}$, and l is the crystal dimension along the beam propagation in cm. The saturated transmission of the same media can be expressed as follows:

$$T = \exp\left\{\frac{-\alpha l}{1+\dfrac{F}{F_s}}\right\}, \quad \text{(Eq. 1b)}$$

where F is the optical fluence in J/cm², and $F_s$ is the saturation fluence in J/cm².

$Cr^{4+}$:YAG is an isotropic cubic crystal and its linear absorption is the same regardless of the light polarization and direction of propagation. However, its nonlinear (saturable) absorption depends on the angle between the light polarization and the crystal axes. Assuming that the light propagates along one of the crystal axes (the 100 axis, for example) and its polarization forms an angle θ with another axis (the 010 axis, for example), the saturable absorption T can be expressed as follows:

$$T = \cos^2\theta \exp\left\{\frac{-\alpha l}{1 + \frac{F\cos^2\theta}{F_s}}\right\} + \sin^2\theta \exp\left\{\frac{-\alpha l}{1 + \frac{F\sin^2\theta}{F_s}}\right\}, \quad \text{(Eq. 2a)}$$

where $F_s$ is the saturation fluence for the optical radiation with polarization along the 010 axis (in this example).

Linear transmission of $Cr^{4+}$:YAG follows equation 1a. For saturated transmission with polarization parallel to one of the crystal axes, the saturable absorption can be expressed as follows:

$$T = \exp\left\{\frac{-\alpha l}{1 + \frac{F}{F_s}}\right\}. \quad \text{(Eq. 2b)}$$

This expression is the same as that for non-crystalline media (Eq. 1b).

For saturated transmission with the angle between the optical polarization and the crystal axis (010 in this example) being θ=45°, the saturation fluence reaches its maximum effective value of $2F_s$. In this case, the saturable absorption can be expressed as follows:

$$T = \exp\left\{\frac{-\alpha l}{1 + \frac{F}{2F_s}}\right\}. \quad \text{(Eq. 2c)}$$

From a comparison of Eqs. 2b and 2c, it follows that double the fluence F is required in the case of a 45° angle between the polarization and the crystal axis to achieve the same transmission as in the case of a 0° angle. This dependence affects the dynamics of passively Q-switched lasers. For example, in the case of a $Cr^{4+}$:YAG SA in an Nd-based laser, the shortest and most energetic pulses are produced when the angle φ between the optical polarization and the axis of the SA is 0° (highest ratio of fluences: $F/F_s$). The longest and the least energetic pulse is generated when θ=45° (lowest ratio: $F/2F_s$). In general, the larger the ratio between the fluence F and the saturation fluence, the shorter and more energetic the Q-switched pulse that is produced.

If the fluence ratio $F/F_S$ varies due to a change of the fluence F, parameters of the Q-switched pulse are affected in a similar manner. This can be achieved by changing the position of the SA within the laser resonator. The diameter of the oscillating mode in the resonator varies along the optical axis, and, therefore, the optical fluence also varies. Higher values of the ratio $F/F_S$ are achieved when the mode diameter is smaller, and lower values of the ratio $F/F_S$ are achieved when the mode diameter is larger.

In an aspect of the present invention, it has been observed that the duration and energy of the mode-locked pulse produced by the laser of FIG. 1 also depends on the $F/F_S$ ratio: the higher the ratio, the shorter and more energetic the pulse that is produced. The ratio $F/F_s$ can be varied by varying the orientation and position of the SA element along the axis of the laser resonator.

Referring to FIG. 1, as discussed above, the oscillating mode of the laser is divergent going from the beam-limiting element 42 toward the reflective surface 14 due to diffraction on the beam-limiting aperture 44. The divergence rate depends on the diameter of the aperture 44: the smaller the aperture, the greater the divergence of the beam. Beam divergence from the laser medium 26 toward the beam-limiting element 42 can be controlled by the curvature of the reflecting surface 18. Generally, it is preferable that the beam is collimated in this portion of the laser cavity. The laser beam has lower fluence going in the distal direction (from the reflecting surface 14 toward the laser medium 26). This is due to the further divergence (from the reflecting surface 14 to beam-limiting element 42, and further toward laser medium 26) and losses through the elements along the beam pathway. Therefore, for purposes of the saturated absorption, only one pass through the SA in the proximal direction (from the laser medium 26 toward the reflecting surface 14) is considered.

Placing the SA element 70 in various locations along the resonator axis changes the mode intensity in it. Therefore, varying the location and orientation of the SA element 70 will yield different laser dynamics resulting in different pulse durations and energies.

Figure 3:
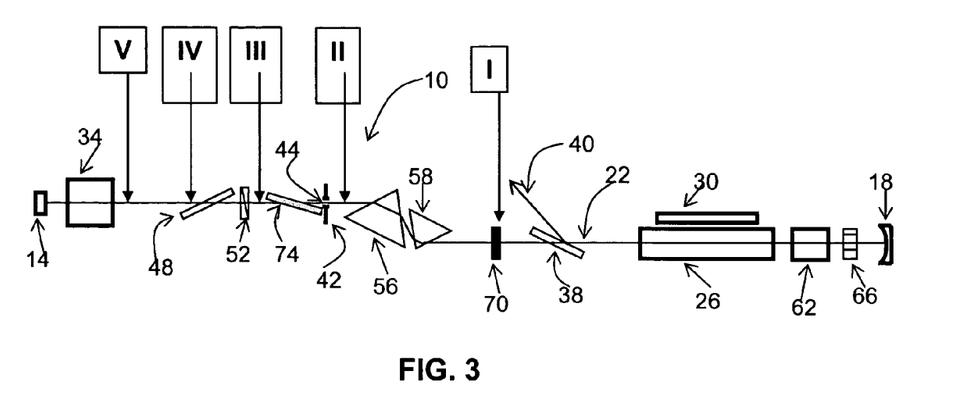
FIG. 3 shows an exemplary embodiment of a laser of the present invention with five possible positions for a saturable absorber (SA) labeled I to V.

FIG. 3 shows the exemplary laser of FIG. 1 without the SA element 70. Five potential positions for the SA element 70 are labeled with Roman numerals I through V. Note that the positions I-V are selected to be to the left (proximal side) of the output polarizer 38. This is so that the residual absorption of the SA element 70 does not affect the output energy. It should be noted that the laser performance with the SA located between the output polarizer 38 and the reflecting surface 18 would be essentially the same as with the SA in positions I-V.

Figure 4A:
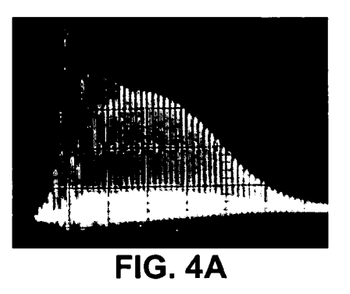
FIGS. 4A through 4C show pulse trains generated by the exemplary laser of FIG. 3 with the SA at position II for three different orientations of the SA relative to the oscillation mode polarization, 0 deg, 22.5 deg, and 45 deg, respectively.
Figure 4B:
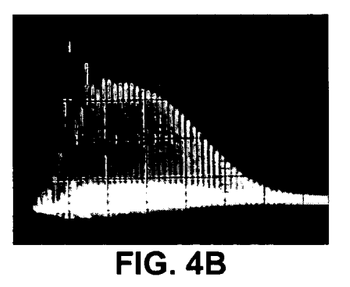
Figure 4C:
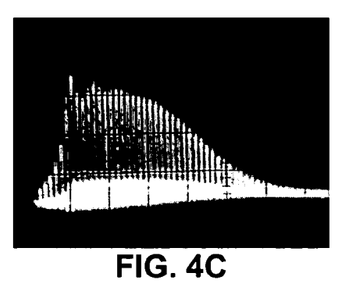
Figure 5A:
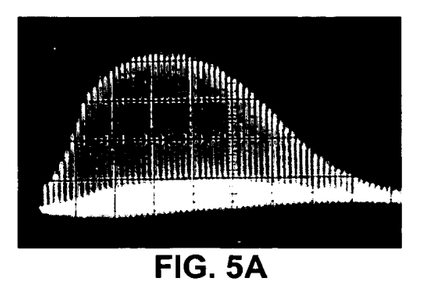
FIGS. 5A through 5C show the pulse trains generated by the laser of FIG. 3 with the SA at position IV for three different orientations of the SA relative to the oscillation mode polarization, 0 deg, 22.5 deg, 45 deg, respectively.
Figure 5B:
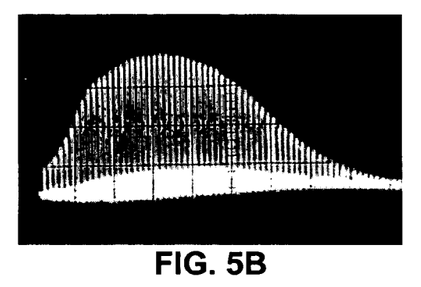
Figure 5C:
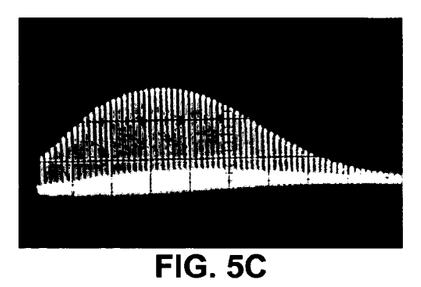

FIGS. 4 and 5 demonstrate laser performance with $Cr^{4+}$:YAG crystal as the SA element 70. FIGS. 4A through 4C show oscilloscope images of the pulse trains generated with the SA element 70 in location II for three different orientations of the SA relative to the oscillation mode polarization: θ=0°, 22.5°, and 45°, respectively. FIGS. 5A through 5C show the pulse trains generated with the SA element 70 in location IV for three different orientations of the SA relative to the oscillation mode polarization: θ=0°, 22.5°, and 45°, respectively. The pulse trains in FIGS. 4 and 5 are as observed by a photodetector located so as to detect the optical radiation scattered from the beam-limiting element 42. The duration of the observed pulses (50-100 ps) is considerably shorter than the resolutions of the photodetector and the oscilloscope. Therefore, the heights of the pulses in FIGS. 4 and 5 are proportional to the pulses' energies.

It is evident from FIGS. 4 and 5 that the shape of the pulse train (i.e., the pulse train envelope) changes in accordance with the position and orientation of the SA element 70. Furthermore, as shown in FIGS. 4 and 5, for a given position, an SA orientation of 0° yields a pulse train with the highest per-pulse energy and shortest pulse duration, whereas an SA orientation of 45° yields a pulse train with the lowest per-pulse energy and longest pulse duration.

Figure 6A:
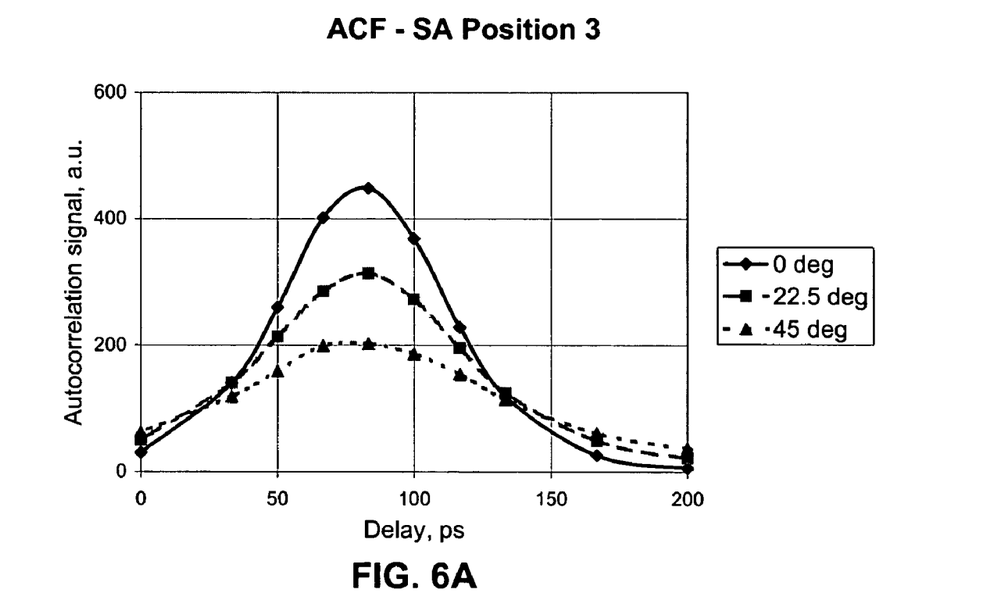
FIG. 6A shows the pulse autocorrelation for three orientations of the SA of the laser of FIG. 3 for the case in which the SA is in position III.
Figure 6B:
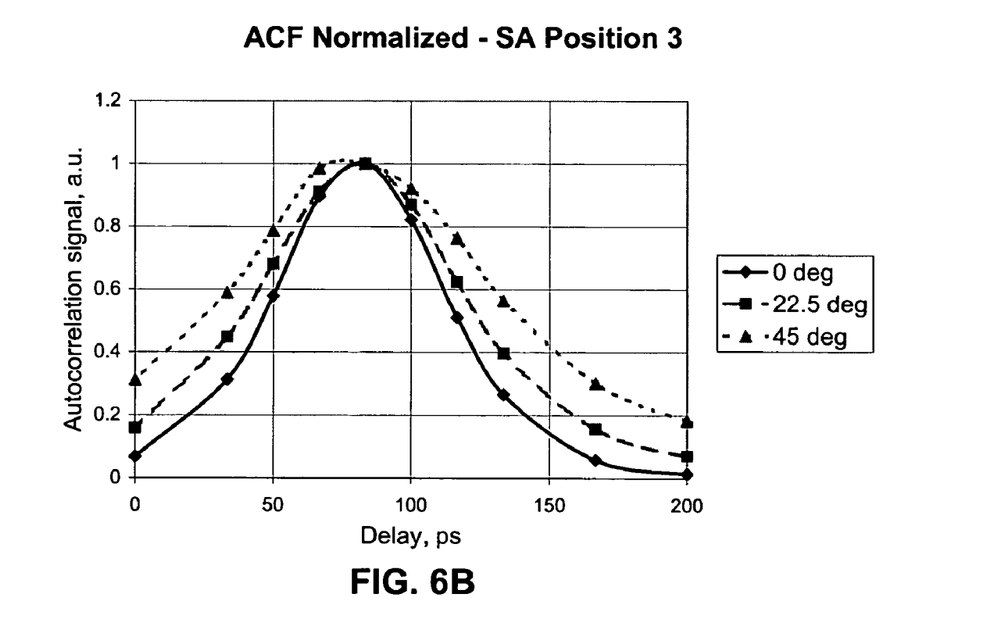
FIG. 6B shows the pulse autocorrelation relations shown in FIG. 6A normalized to the maximum value of each autocorrelation.

Non-collinear intensity autocorrelation can be used to characterize the pulse duration of the laser output. FIG. 6 shows the pulse autocorrelation for three SA orientations (i.e., the angle θ between the crystalline axis 010 and the optical polarization is 0°, 22.5°, and 45°, respectively) for the case in which the SA element 70 is at position III. Following standard procedure, the pulse durations were calculated assuming a Gaussian pulse shape. In this case, the shortest pulse duration is about 52 ps, and the longest is about 90 ps.

Figure 7:
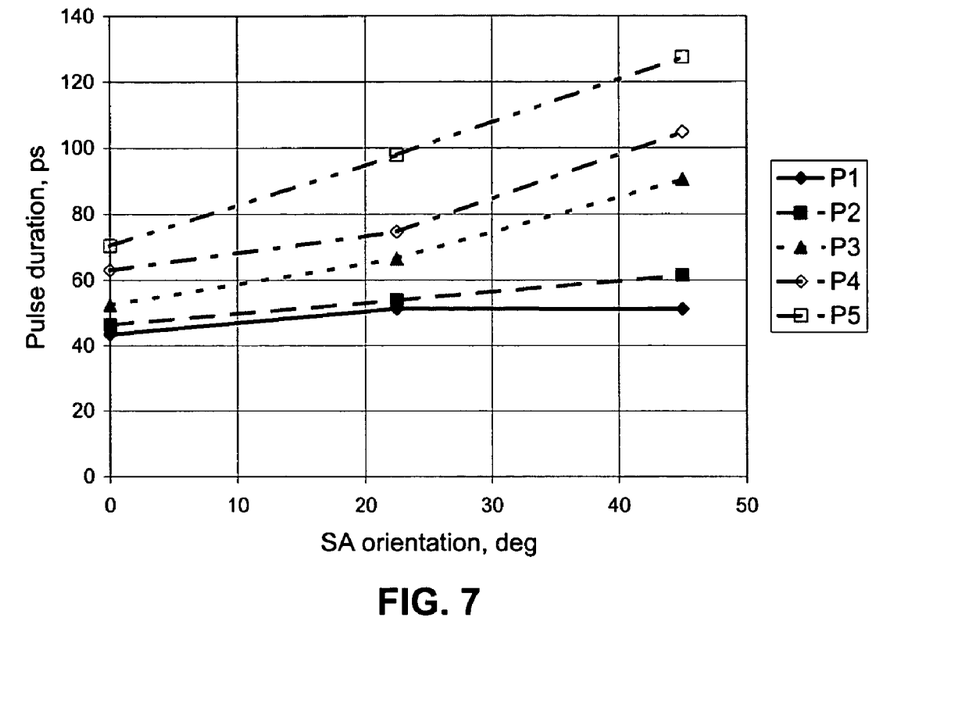
FIG. 7 shows a chart of pulse duration as a function of SA orientation for all five positions I-V of the SA.

FIG. 7 shows a chart of pulse duration as a function of SA orientation for all five SA positions I-V. As can be seen from FIG. 7, there is a trend in pulse duration when the SA element 70 is in positions I-V: as the angle between the SA element crystal axis 010 and the optical polarization increases, the pulse duration increases.

As shown in FIG. 7, the measured pulse duration varies from 43.4 ps (for position I, orientation 0°) to 127.5 ps (for position V, orientation 45°), for the exemplary laser of FIG. 3. In the exemplary embodiment shown, the variability of the pulse duration is approximately three times (i.e., 127.5 to 43.4), although variability on the order of twenty times should be achievable (i.e., 11-12 ps, at the short end of the range, comparable to a laser with a dye solution SA, and 200 ps at the long end of the range.)

As discussed, pulse duration can be varied by varying the location and orientation of the SA along the beam path. In an exemplary embodiment of a laser in accordance with the present invention in which pulse duration is adjustable, an SA element can be selectively inserted into the beam path at one of the five positions described above to provide coarse pulse duration variability. The orientation of the SA element at each position can be varied between 0 and 45 degrees to provide fine pulse duration variability. The selective insertion and rotation of the SA element can be implemented using known elements, such as actuators, servo motors, and the like. Moreover, there may be one or more SA elements that are moved within the laser to the various positions or an SA element for each position that is selectively moved into or out of the beam path at the respective position. Furthermore, there may be more than five or fewer than five possible locations and there may be more than three or fewer than three possible orientations for the SA element.

It is to be understood that while the invention has been described above in conjunction with preferred specific embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A laser defining a cavity, the cavity housing a proximal reflective surface, a distal reflective surface, a beam pathway therebetween, and, along the beam pathway, a solid-state laser medium, a source of pulsed energy for energizing the laser medium, means for providing an energy output from the cavity, and a beam-limiting element, the laser comprising:
    a passive negative feedback (PNF) element arranged along the beam pathway; and
    a saturable absorber (SA) element arranged along the beam pathway for Q-switching the laser, said SA element having an absorption recovery time which is longer than an output pulse duration, wherein a location of the SA element is variable so that the SA element can be positioned between different pairs of other components of the laser and wherein the output pulse duration can be varied by varying location of the SA element between the different pairs of the other components of the laser.

2. The laser of claim 1, wherein the output pulse duration can be varied from about 20 picoseconds to about 200 picoseconds.

3. The laser of claim 1, wherein the output pulse duration can be varied by a factor between 1 and 20, inclusive.

4. The laser of claim 1, wherein the laser produces at least one output pulse having an energy of from about 100 µJ to about 2 mJ.

5. The laser of claim 1, wherein the laser medium comprises a $Nd^{3+}$:YAG crystal.

6. The laser of claim 1, wherein the SA element is arranged between the proximal reflective surface and the means for providing an energy output from the cavity.

7. The laser of claim 1, wherein the location of the SA element can be selected to be one of a plurality of locations between the proximal reflective surface and the means for providing an energy output from the cavity.

8. The laser of claim 1, wherein an orientation of the SA element can be selected to be one of a plurality of orientations between a first and a second angle relative to a polarization of the beam in the beam pathway.

9. The laser of claim 8, wherein the first angle is approximately 0° and the second angle is approximately 45° between the optical polarization and the one of the optical axis of the SA element.

10. The laser of claim 1, wherein said SA element comprises a solid-state element.

11. The laser of claim 1, wherein said SA element comprises a $Cr^{4+}$:YAG crystal.

12. The laser of claim 1, wherein said SA element comprises a LiF:($F_2$) color center crystal.

13. The laser of claim 1, wherein the SA element is rotatably mounted in the cavity so that an orientation of the SA element can vary from a first angle to a second angle relative to a polarization of the beam in the beam pathway.

14. The laser of claim 1, wherein the laser further comprises
    a half-wave plate disposed in the cavity between the PNF element and the proximal reflective surface;
    a partially reflecting optical element disposed in the cavity between the half-wave plate and the proximal reflective surface; and an acousto-optic mode-locker disposed in the cavity between the partially reflecting optical element and the proximal reflective surface; wherein a first position of the SA is between the half-wave plate and the passive negative feedback element and a second position of the SA is between the partially reflecting optical element and the acousto-optic mode-locker;
    and wherein the location of the SA element is variable so that the SA element can be positioned in at least the first and second positions.

15. A method of varying a duration of an energy pulse output from a laser, the laser defining a beam pathway therein and housing a solid-state laser medium and a source of pulsed energy for energizing the laser medium, the method comprising:
    providing a passive negative feedback (PNF) element along the beam pathway;
    providing a saturable absorber (SA) element along the beam pathway for Q-switching the laser, the SA element having an absorption recovery time which is longer than an output pulse duration; and varying a position of the SA element so that the SA element is sequentially positioned between different pairs of other components of the laser, whereby the output pulse duration is varied.

16. The method of claim 15, wherein the output pulse duration can be varied from about 20 picoseconds to about 200 picoseconds.

17. The method of claim 15, comprising:
energizing the laser medium to produce at least one output pulse having an energy of from about 100 µJ to about 2 mJ.

18. The method of claim 15, wherein the laser medium comprises a $Nd^{3+}$:YAG crystal.

19. The method of claim 15, wherein the SA element is arranged between a proximal reflective surface and means for providing an energy output from the cavity.

20. The method of claim 19, wherein the location of the SA element can be selected to be one of a plurality of locations between the proximal reflective surface and the means for providing an energy output from the cavity.

21. The method of claim 15, wherein an orientation of the SA element can be selected to be one of a plurality of orientations between a first and a second angle relative to a polarization of the beam in the beam pathway.

22. The method of claim 21, wherein the first angle is approximately 0° and the second angle is approximately 45°.

23. The method of claim 15, wherein said SA element comprises a solid-state element.

24. The method of claim 15, wherein said SA element comprises a $Cr^{4+}$:YAG crystal.

25. The method of claim 15, wherein said SA element comprises a $LiF:(F_2)$ color center crystal.

26. The method of claim 15, wherein the output pulse duration can be varied by a factor between 1 and 20, inclusive.

27. The method of claim 15, wherein varying at least one of a position and an orientation of the SA element comprises rotatably mounting the SA element in the laser and rotating the SA element to an orientation in a range from a first angle to a second angle relative to a polarization of the beam in the beam pathway.

28. A laser comprising:
a proximal reflective surface;
a distal reflective surface, wherein a beam pathway is defined between the proximal reflective surface and the distal reflective surface;
a solid-state laser medium arranged along the beam pathway;
a source of pulsed energy for energizing the laser medium;
a passive negative feedback (PNF) element arranged along the beam pathway;
an acousto-optic mode-locker arranged along the beam pathway; and
a saturable absorber (SA) element arranged along the beam pathway and disposed between the PNF element and the acousto-optic mode-locker.

* * * * *